United States Patent [19]

Schuman

[11] E Re. 30,894

[45] Reissued * Apr. 6, 1982

[54] OSCILLATING PISTON APPARATUS

[76] Inventor: Mark Schuman, 101 G St., SW., Apt. #516, Washington, D.C. 20024

[ * ] Notice: The portion of the term of this patent subsequent to Apr. 30, 1991, has been disclaimed.

[21] Appl. No.: 713,841

[22] Filed: Aug. 12, 1976

Related U.S. Patent Documents

Reissue of:

[64] Patent No.: 3,899,888
Issued: Aug. 19, 1975
Appl. No.: 465,138
Filed: Apr. 29, 1974

U.S. Applications:

[63] Continuation of Ser. No. 227,514, Feb. 18, 1972, Pat. No. 3,807,904, which is a continuation-in-part of Ser. No. 121,371, Mar. 5, 1971, abandoned.

[51] Int. Cl.[3] ..... F02G 1/04
[52] U.S. Cl. ..... 60/520
[58] Field of Search ..... 60/517-526; 417/207

[56] References Cited

U.S. PATENT DOCUMENTS 3,807,904 4/1974 Schuman ..... 417/207

FOREIGN PATENT DOCUMENTS 834125 3/1951 Fed. Rep. of Germany .

OTHER PUBLICATIONS

"Free Piston Stirling Engines", by William Beale, SAE Paper 690230, Jan. 1969.

"A Free-Piston Stirling Engine Inertia Compressor for Gas Fired Air Conditioning", Second Conference on Natural Gas Research & Technology, Atlanta, Georgia, Jun. 5, 1972, American Gas Association.

"Free Cylinder Stirling Engines for Solar-Powered Water Pumps", ASME Paper 71-WA/SOL-11.

*Primary Examiner*—Allen M. Ostrager
*Attorney, Agent, or Firm*—Lowe, King, Price & Becker

[57] ABSTRACT

A substantially closed cylinder containing a compressible fluid, such as air, and a free piston for reciprocation within the cylinder, and a number of elongated passageways, each having an end opening into the cylinder and an opposite closed end. The passageways are heated along their lengths. The fin-shaped open end portions and the cylinder wall are cooled. Piston reciprocation is effected by the force of heated expanding gas moving from the closed ends of the passageways to drive the piston in one direction as the gas cools in the region between the piston end and the cooled open ends of the passageways. The piston compresses the gas at the opposite piston face, which gas in turn drives the piston back after the force of the compressed gas exceeds the force of the cooling gas to regularly repeat such cycle.

162 Claims, 18 Drawing Figures

FIG. 1
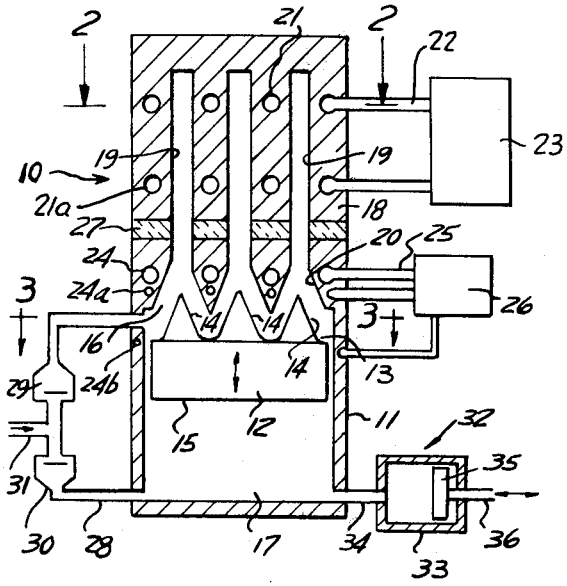
FIG. 2
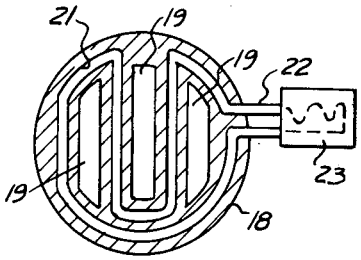
FIG. 3
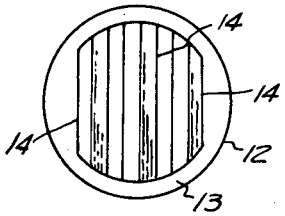
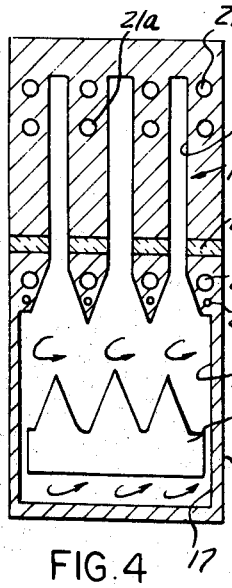
FIG. 4
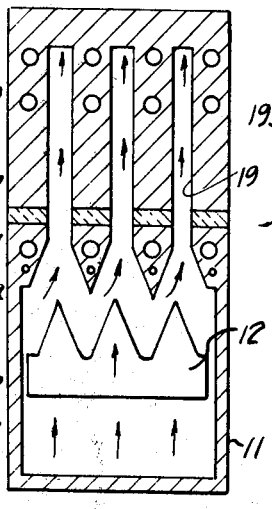
FIG. 5
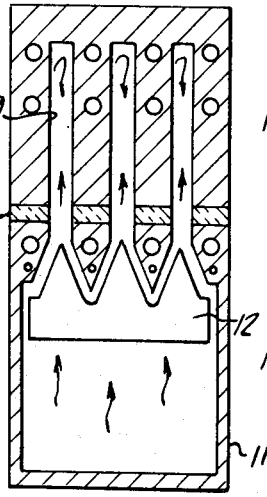
FIG. 6
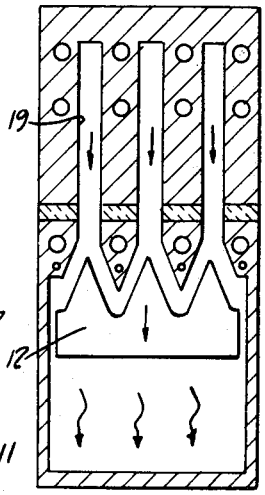
FIG. 7

FIG.8
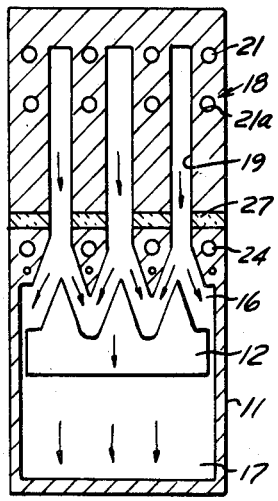
FIG.9
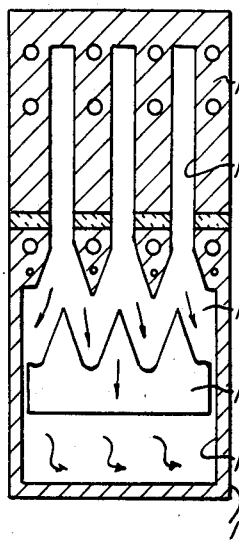
FIG.10
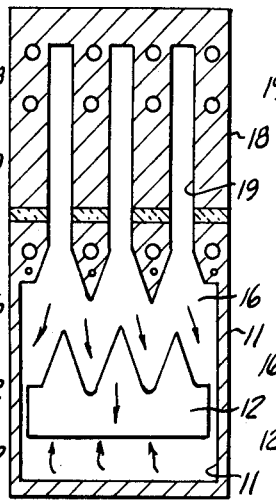
FIG.11
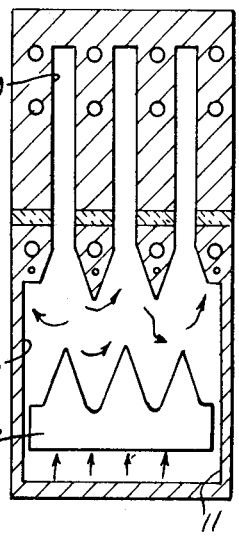
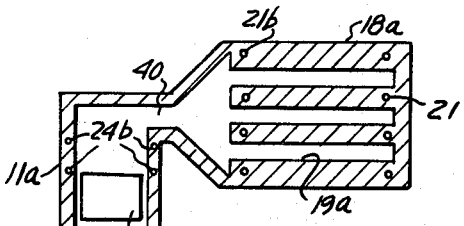
FIG.12
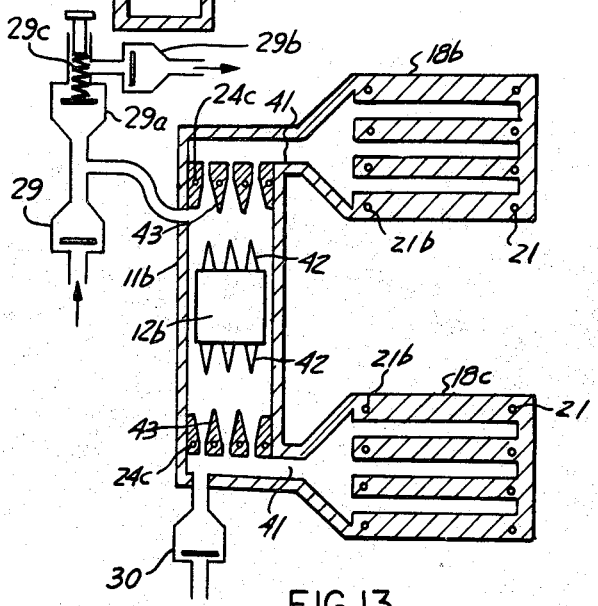
FIG.13
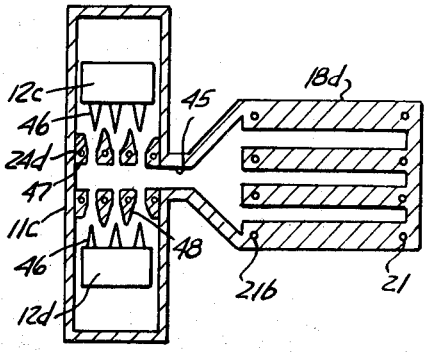
FIG.14

FIG. 15
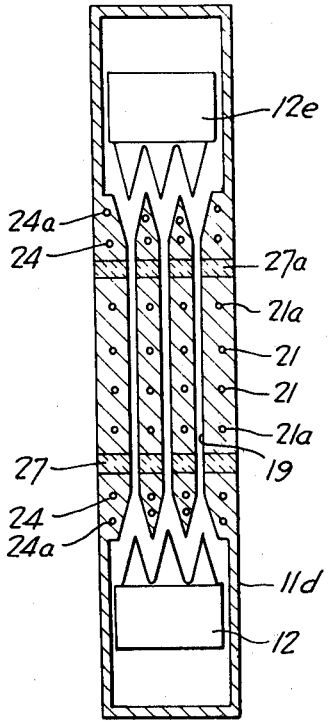
FIG. 16
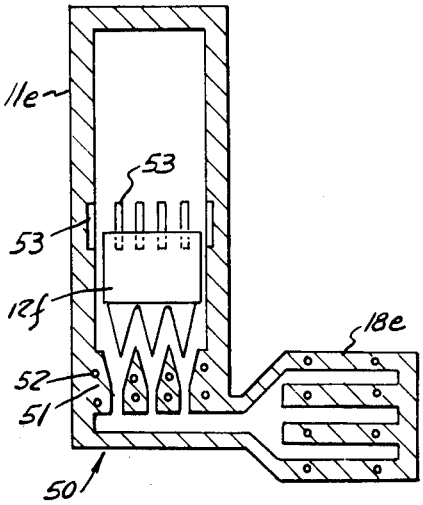
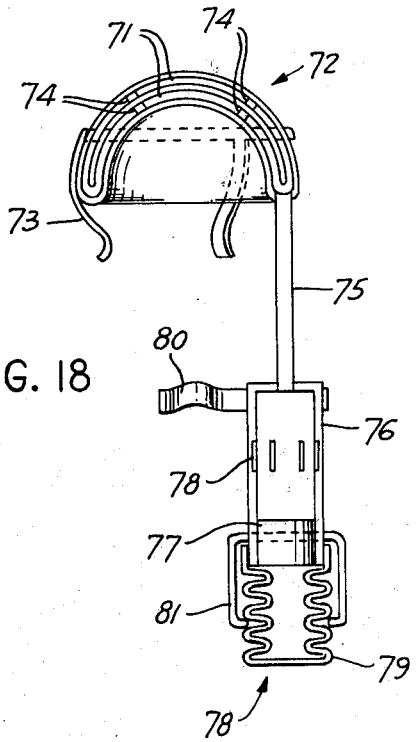
FIG. 18
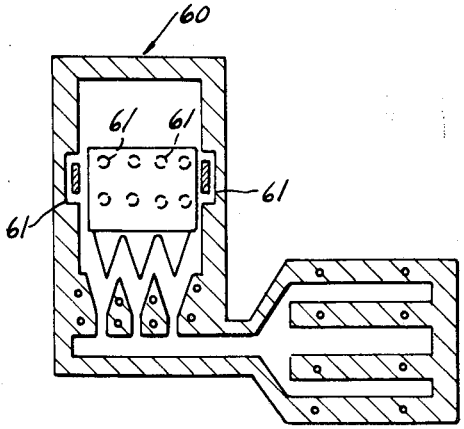
FIG. 17

OSCILLATING PISTON APPARATUS

Matter enclosed in heavy brackets [ ] appears in the original patent but forms no part of this reissue specification; matter printed in italics indicates the additions made by reissue.

RELATIONSHIP TO CO-PENDING APPLICATION

The present application is a continuation of my co-pending application, Ser. No. 227,514, filed Feb. 18, 1972, for "Oscillating Piston Apparatus", now U.S. Pat. No. 3,807,904, granted Apr. 30, 1974, which in turn is a continuation-in-part of application Ser. No. 121,371, filed Mar. 5, 1971, now abandoned.

BACKGROUND OF THE INVENTION

The apparatus herein relates to an oscillating piston and cylinder construction which may be used as a pump, such as is described in my U.S. Pat. No. 3,489,335, now reissued as U.S. Pat. No. Re. 27,740 or as a gas analyzer mechanism such as is disclosed in my U.S. Pat. No. 3,516,745, or as part of an engine such as is described in U.S. Pat. No. 3,583,155, or other devices which utilize thermal energy for power. The apparatus herein is a simplification of and in some directions an improvement of the equipment described in the foregoing patents and applications.

More specifically, the present invention provides [more] *some* preferred forms of heat transfer surfaces for driving a moving part, e.g., a piston, whereby the heat transfer surfaces are in structures that are relatively efficient and compact. Means are also provided for eliminating some or all of the valves and other pieces of mechanism which were utilized in the abovementioned equipment for restricting fluid flow into a heating chamber and for positioning the center [or] *of* piston oscillation.

SUMMARY OF THE INVENTION

Summarizing, the invention herein contemplates forming a number of elongated passageways, each opening into a drive chamber near one face of a moving oscillating wall of the chamber, which may be formed by a piston face. Each of the passageways is heated and the drive chamber is cooled whereby a temperature gradient exists between the drive chamber and the passageways. A compressible fluid, such as air, is forced by the piston face into and through the passageways. The fluid is heated in the passageways and is returned back to the drive chamber to drive the piston in one direction. Simultaneously, the piston compresses the fluid at its opposite face and the compression of fluid in this opposite chamber of the cylinder in which the piston oscillates causes the piston to rebound or return. Fluid entering the drive [chanber] *chamber* during the oscillation cycle is simultaneously cooled to assist in driving the piston in the other direction to thereby regularly repeat the cycle of piston and gas movement.

By using long passageways, heated near one end and cooled near their openings into the drive chamber for providing a difference in temperature between the passageways and the drive chamber, thermopneumatic energy is thereby provided to sustain the natural resonance [of] *or* oscillation of the piston between the gaseous compression springs at opposite faces of the piston, without the need for additional valving and other mechanical controls. A sealing action of the piston against side walls of the cylinders separates the gaseous compression springs and the mass of the piston decreases the resonant frequency to improve the efficiency and power of the device.

These and other objects and advantages of this invention will become apparent upon reading the following description, of which the attached drawings form a part.

DESCRIPTION OF THE DRAWINGS

FIG. 1 is a schematic, elevational, cross-sectional view of the oscillating piston apparatus;

FIG. 2 is a cross-sectional view taken in the direction of arrows 2—2 of FIG. 1;

FIG. 3 is a top *or* plan view of the piston taken in the direction of arrows 3—3 of FIG. 1;

FIGS. 4–11, inclusive, show successive positions of the piston during one cycle;

FIG. 12 is an elevational, schematic, cross-sectional view of a modification;

FIGS. 13–17 each illustrate schematic, cross-sectional, views of different modifications; and FIG. 18 is a cross-sectional view of a novelty device utilizing the principles of the present invention.

DETAILED DESCRIPTION OF THE DRAWINGS

Referring to FIGS. 1–3, the oscillating piston apparatus 10 is formed of a closed cylinder 11 containing a free piston 12. The piston has an upper drive face 13 formed with integral, wedge-shaped fins 14. The opposite piston face 15 forms a compression face. Free piston 12 can be considered as having an integral form that has substantially the same cross sectional dimensions and working area throughout its length.

The piston 12 divides the cylinder into an upper, drive, cooling chamber portion 16 and a lower, compression chamber portion 17 which are normally separated from each other by a seal formed between the side walls of cylinder 11 and piston 12. The upper and lower faces of piston 12 can be considered as moving walls of variable volume chambers having fixed walls defined by the upper and lower portions of cylinder 11.

The upper end or head 18 of the cylinder located above the upper chamber, is formed with a passageway means comprising a number of heated *elongated* passageways 19, having closed upper ends and lower ends 20 which open into the upper chamber 16 with flared or outwardly wedge-shaped openings to provide greater surface area for cooling. The lower ends 20 correspond in shape to the wedge-shaped fins 14 on the piston 12, to form mating variable geometry cooling passageways. Alternatively, the upper drive face 13 of the piston may be flat and the lower ends 20 of the passageways 19 not flared or wedge-shaped. The passageway lower ends 20 variably exposed by the fins 14 of piston 12 serve as passageway means for cooling heated gas flowing into drive chamber 16.

The upper or closed ends of the passageways 19 are heated by means of a suitable, independent heating mechanism, such as heating tube 21 for carrying a heated fluid through exterior pipes 22 from a suitable external heater 23. The heating mechanism may be varied and its specific construction forms no part of the invention herein. A lower heating tube 21a may also be included to supply heat some distance below the upper ends of the passageways.

The lower [ends] *end* portions or open ends 20 of passageways 19 are cooled by cooling tube 24, connected by exterior pipes 25 to an external cooling device 26. Another cooling tube 24a, at the bottom of the flared ends 20, may also be [include] *included* for better cooling. Also a third cooling tube 24b, arranged in the cylinder wall, may be used to cool the cylinder wall surface in the region traversed and variably exposed by the upper drive face 13 of the piston. The form of the cooling device is not part of the invention and may be varied. The object here is to provide one or more heated passageways opening into a cooled chamber containing the piston face, such that the drive chamber has one or more variably exposed cooled passageways. The cooled and heated passageways are formed of a heat conductive material so that there is a temperature variation between the heated passageways and the cooled drive chamber including the cooled passageway openings. Preferably an insulating layer 27 is provided between the wall portions defining upper and lower parts of the passageways to reduce wasteful heat flow. More than one insulating layer may also be used, forming a somewhat laminated structure. Instead of being straight and arranged in parallel, the fins and passageways may be arranged in other configurations, e.g., the passageways and fins may be circular and arranged in concentric rings. The passageways may, in the alternative, be outside of the cylinder and enter the drive chamber via a port in the side wall of the cylinder.

The upper chamber 16 is connected to the lower cylinder chamber 17, around the piston, by a shunt pipe 28 containing an upper, normally closed valve 29 and a lower, normally closed valve 30, in turn connected to a gas or air inlet 31. Valves 29 and 30 are made of a conventional [wager] *wafer*, ball, or similar type of pressure closing valve, of the type which is essentially sealed when closed. However, the valves are generally formed so that they do not tightly close at relatively low pressure differential but permit some leakage through them. Leakage through valves 29 and 30 decreases substantially to zero as the differential pressure across each valve increases.

The valves 29 and 30 permit a small upward flow of gas around the piston. When the piston moves up, some gas may leak through the valve [20] *29* to pipe 31. When piston 12 is near the top of its stroke, a small amount of gas enters into the lower chamber 17 due to the valve 30 opening. On the piston downstroke, valve 30 closes whereas gas may enter through valve 29. Due to the weight of the piston, there is a little less gas, and a little higher compression ratio, below the piston than above it. Thus, gas tends to flow upwardly around the piston, and is replaced by a net intake of gas through valve 30 and a net leakage through valve 29. If piston 12 drifts too low, the higher compression ratio below its lower face causes upward movement of the piston, whereby more gas is drawn through valve 30.

To start the reciprocation or oscillation of piston 12, a starting mechanism is necessary. This is schematically illustrated as starter 32, including an external cylinder 33 connected by a pipe 34 into the lower chamber 17 of the main cylinder 11. A piston 35 connected to a piston rod 36, which is moved back and forth (left to right and vice versa as illustrated) by a suitable drive mechanism (not shown) to draw gas through valve 30 into the cylinder 33 and to move gas from the cylinder 33 into the chamber 17 and vice versa to force the piston 12 to move up and down. Once the piston 12 begins moving due to the full operation of the heating device 23 and cooling device 26, the starter is deactivated and positioned close to chamber 17, i.e., at the extreme left, as viewed in FIG. 1. Usually a single cycle of the piston 35 is sufficient to initiate oscillation.

The oscillation of piston 12 at a particular frequency is determined by a number of factors, including: the inertia or mass of piston 12 and the effect of pneumatic springs formed by the gases compressed by the upper and lower faces of piston 12 while the piston is oscillating. The means for sustaining oscillation includes these factors and further includes: the thermal lag properties of the passageways means, i.e., the time or portion of an [oscillating] *oscillation* cycle of piston 12 for the maximum and minimum gas temperatures to occur after maximum and minimum compression of the gas in the chamber formed by the passageways and the upper face of piston 12; the amount of heating of gas in passageways 19; the amount of gas cooling in drive chamber 16. It is to be noted that the net flow of cool fluid (fluid colder than the temperature of the hot walls of the passageways 19) that flows or is induced to flow into passageways 19, by the upper face of piston 12, while the piston is approaching the passageways, is primarily and directly responsive to pressure variations in this fluid. Further, the pressure variations in the fluid being compressed into passageways 19 is primarily and directly responsive to the changes in the volume of the chamber defined by the upper face of piston 12 and the passageways 19, which changes in volume are caused by the moving chamber wall comprised of the upper face of piston 12.

OPERATION

FIGS. 4–11, inclusive, show successive steps in one cycle of movement of the piston 12. Starting with FIG. 4, the piston is shown in its bottom, dead center postion. At bottom dead center, the gas below the piston in the compression chamber (see arrows) pushes the piston upwardly with greater force than is exerted against the upper face of the piston by the expanded, cooling gas in the drive chamber.

FIG. 5 shows the piston moving upwardly under the rebound of the compressed gas in the compression chamber and driving the still cooling gas upwardly into the passageways 19.

FIG. 6 shows the piston in the top dead center position, wherein the pressure of the gas below piston 12 is less than the pressure of the gas above the piston and the gas above the piston is being heated and beginning to return downwardly from the upper closed ends of the passageways 19.

FIG. 7 shows the gas, while still being heated in the passageways 19 expanding from the passageways into the upper, drive chamber to force piston 12 downwardly with the piston compressing the gas below it.

In FIG. 8, piston 12 is about one-quarter of the way down, compressing the gas below it to force the gas downwardly in response to the expanding gas above the piston. The expanding gas above the piston 12 is simultaneously being cooled at the lower or outlet ends of passageways 19.

In FIG. 9, piston 12 is about one-half way down, and the force of the gas being compressed beneath the piston is increasing while the force of the gas above the piston is decreasing due to the increased volume of the drive chamber and the decreased volume in the lower chamber, as well as the cooling of the gas in the drive chamber.

FIG. 10 shows the piston about three-quarters of the way down with the pressure of the compressed gas below the piston now exceeding the pressure of the cooling gas above the piston so that the speed of the piston decreases.

FIG. 11 shows piston 12 at its bottom position again, with the compressed gas below the piston now pushing the piston upwardly against the decreased pressure of the cooling gas above the piston; at this time the pressure above piston 12 is considerably less than the pressure below the piston. Thereafter, the cycle repeats with the piston rapidly oscillating or reciprocating up and down during the repetition of each cycle.

MODIFICATION FIG. 12

FIG. 12 shows a modification wherein the cylinder head 18a is arranged to one side of the top of cylinder 11a and opens into the top of cylinder through a nozzle like opening 40. The piston 12a may have a smooth or flat top. The fins may be omitted whenever significant power or amplitude of oscillation is not required. The cylinder wall is cooled by cooling tube 24b. The operation and construction is otherwise the same as that described above in connection with FIG. 1. By locating the passageways 19a off to one side of the cylinder, a single set of passageways can be used to synchronously drive more than one piston (see FIG. 14, below). Also, without the fins, the cylinder is clear for use as a variable volume optical chamber gas analyzer by providing the necessary transparent windows in the cylinder either above or below the piston as is described in my prior U.S. Pat. No. 3,516,745, of June 9, 1970.

MODIFICATION FIG. 13

FIG. 13 shows a construction having a pair of side cylinder heads 18b, 18c, each having heating tubes 21 and 21b, as described above. The cylinder heads open through nozzle-like openings 41, into the cylinder 11b, above and below the piston 12b. The piston has upper and lower fins 42 which mesh with fixed cooling fins 43 having cooling pipes 24c. Thus, the piston 12b is positively driven in both directions so that the opposite faces of the piston can be considered as opposed moving walls of a pair of chambers, which walls have a relative phase displacement of 180°.

FIG. 13 also shows check valves 29 and 30 polarized to pass air [through] *into* the chambers above and below piston 12b for positioning the center of piston oscillation. Adjustable, spring biased, flow limiter valve 29a passes an adjustable amount of air to a load (not shown) only when the pressure in the upper cylinder chamber is greater than load pressure by a small amount determined by the position of spring 29c. Check valve 29b keeps air from returning from the load. Check valves 29a and 29b can control the pumping power supplied to a load so that piston 12b is not stalled.

MODIFICATION FIG. 14

FIG. 14 shows another modification wherein the cylinder head 18d, which has the same configuration as those shown in FIGS. 12 and 13, has a fluid flow path into the center of the cylinder 11c through nozzle-like opening 45. A pair of pistons 12c, 12d, each having fins 46 on their inner faces, mesh with spaced apart central cooling fins 47–48, having integral cooling pipes 24d. The two pistons are synchronized to move in opposite directions at all times. That is, pistons 12c and 12d are driven apart by the cooling gas located between them, and rebound towards each other by the gas which they compress at the opposite ends of the cylinder. Synchronizing oscillation of the two pistons in this manner can essentially eliminate vibration of the device. More than two pistons can also be synchronized in this manner. Also an additional set of cooling fins in, and heated passageways opening into, each compression chamber, can be added for additional power. The facing faces of pistons 12c and 12d can thereby be considered as synchronized moving walls of a variable volume chamber. The chamber walls move toward each other to compress gas fed into passageways of cylinder head 18d and move away from each other to expand the chamber volume in response to heated gas being ejected from the passageways.

MODIFICATION FIG. 15

FIG. 15 [illustrated] *illustrates* a modification which is similar to that shown in FIG. 1 above, except that an additional piston 12e is added at the upper end and passageways 19 are not closed at one end. Thus, the cylinder lid is elongated upwardly, as are the passageways 19. The cooling tubes 24 and 24a and the heating tubes 21 and 21a are duplicated and a second insulating or thermal barrier 27a is provided. The upper piston 12e is provided with fins, as in FIG. 1, to mesh with the flared upper ends of the passageways 19. The operation is the same as that described above in connection with FIG. 1, except for the driving of two pistons 12–12e, instead on the one piston as illustrated in connection with FIG. 1. Alternatively, the stationary and moving fins may be omitted but the drive chamber walls would nevertheless be cooled. Gases flowing in the upper and lower portions of passageways 19 in response to oscillation of pistons 12 and 12e have a tendency to remain separate from each other even though there is no mechanical obstruction across the passageways.

MODIFICATION FIG. 16

FIG. 16 illustrates an oscillating piston apparatus 50 including a cylinder 11e which contains a single piston 12f, having lower face fins meshing with fixed cooling fins 51. Fins 51 include cooling tubes 52 similar to those described above in connection with FIGS. 13 and 14. In FIG. 16, head 18e, which is the same as the heads described above in connection with FIGS. 12, 13 and 14, is offset to one side and opens into the cylinder on the side of the cooling fins 51 opposite the piston 12f.

For purposes of positioning the piston 12f, without using valves, vertical grooves 53 are formed in the center portion of the cylinder 11e, that is, in the wall of the cylinder. Grooves 53 are by-pass passageways around a portion of the cylinder, which passageways have a fluid flow impedance that is substantially the same to fluid flow in both directions through the passageways. Thus, as the piston moves up and down, the leakage of gas, above and below the piston through the grooves 53, tend to maintain *the* center of piston oscillation near the center of grooves 53. If, for example, the center of piston oscillation drifts below the center of the grooves 53, more gas leaks downwardly around piston 12f through the grooves 53 while the piston is in the upper portion of its stroke, than leaks upwardly during the bottom portion of its stroke. There is, thereby, a net flow of gas downwardly to raise the center of piston oscillation upwardly.

MODIFICATION FIG. 17

FIG. 17 illustrates apparatus 60 which is identical to that described above in connection with FIG. 16, except that instead of the centering grooves. U-shaped by-pass tubes 61 are formed in the wall of the cylinder for purposes of keeping the center of piston oscillation near or at the center or midpoint of the [U-shaped] *U-shaped* bypass tube 61. In FIGS. 13, 14, 16 and 17 the heated passageways may alternatively be connected to the drive chamber(s) via a port(s) in the cylinder side wall between the piston and the fixed cooling fins.

MODIFICATION FIG. 18

Reference is now made ot FIG. 18 wherein there is illustrated a novelty device or a physics demonstration device adapted to be powered by heat from a convenient source, such as a lamp of the incandescent type. A pair of arcuate, heated passageways, 71 is located in a partially transparent housing 72 having a [shaped] *shape* adapted to mate with an incandescent light bulb globe (not shown). The globe supports housing 72 with the aid of metal clip or holding strap 73 that is fixedly mounted on housing 72 and is adapted to be frictionally connected to the globe. Heating of passageways 71 by heat from the lamp can be augmented by providing the housing 72 with radiation absorbing substances, e.g., colored glass. It is to be understood that a single heated passageway may provide sufficient heating to operate the device.

Passageways 71, as well as passageways 19, are relatively long and have considerable breadth, but are relatively narrow in width to provide optimum oscillation of gases therein. If housing 72 and passageways 71 are formed of a relatively weak material, e.g., glass, spacing between walls of the passageways is preferably maintained by spacers 74, that are sufficiently small to have only a slight effect on fluid flow in the passageways.

One end of each of passageways 71 is connected in fluid flow relationship to one end of hollow tube 75, that is downwardly depending from housing 72. The other end of tube 75 is connected in fluid flow relationship with transparent cylinder 76 that contains free piston 77. Cylinder 76 can be maintained securely in situ by spring clip 80 that is adapted to be secured to a suitable support, such as a lamp pole that carries the bulb for supporting housing 72. Gas in cylinder 76 is cooled by air from the surrounding environment, without resort to cooling by cooling coils. To center piston 77, cylinder 76 includes a number of longitudinal grooves 78, centrally located on its interior side wall.

To initiate oscillation of piston 77, the lower end of cylinder 76 is in fluid flow relationship with starter 78 that includes a rubber or plastic bellows [78] *79* having an upper interior wall bonded to the exterior, lower wall of cylinder 76. Leaf springs 81 catch the folds or lower end face of bellows 79 to maintain the bellows in a compressed state after the bellows has been compressed by an operator. Prior to compression of the bellows the lower face of piston 77 bears against the uppermost fold of bellows 79. In certain instances, it is desirable to space the uppermost bellows fold from the lower edge of cylinder 76 to provide a leaky cylinder during starting, whereby air can get below the lower edge of cylinder 76 and establish a better rebound chamber.

In each of the described embodiments, by using the ideal gas law it can be shown that for a given low compression ratio (less than 2:1), the pneumatic power supplied by the heating and cooling means to the piston to sustain piston oscillation is approximately proportional to the amplitude or amount of temperature variation of the gas during the cycle and to the sine of the phase angle of thermal lag introduced primarily by the passageways, i.e., the phase [leg] *lag* of the variation in the average temperature of gas in the chamber with respect to the instantaneous compression ratio. The instantaneous compression ratio can be defined as the ratio of the maximum chamber volume to the instantaneous chamber volume. As illustrated, the length and breadth of each passageway typically are each substantially greater than the passageway width, which may be substantially constant throughout the length and breadth of the passageways. The passageway width is chosen according to the desired frequency of piston [operation] *oscillation* to be sufficiently narrow and uniform to heat or cool substantially all of the gas in the passageway sufficiently to provide an adequate amplitude of temperature variation. Heating is provided by passageways 19 and cooling by passageways between teeth 14 of piston 12 and by the cylinder wall portion traversed by the piston face.

The amplitude of the variation in average gas temperature during the cycle is determined by the amount of gas which is heated and cooled during the cycle and also by the amount of heating and cooling of this gas.

The passageways are preferably sufficiently narrow to allow heating or cooling of the gas emerging from the passageways throughout [the] substantially all of the cross section of the passageways, whereby there is heating or cooling of gas near the center of the passageways, as well as at the walls of the passageways. The passageway width must, however, be wide enough to readily admit sufficient quantities of gas for heating or cooling of the gas in the passageways 19. The passageway width must also be wide enough to provide an adequate angle of thermal lag such that gas is being heated and fed from the thermal lag heater to the piston as the piston is moving away from the heated passageway, and gas is being cooled in the thermal lag cooling chamber (drive chamber) as the piston moves toward the heated passageways, to maintain the piston in oscillation. Thus, a compromise width is generally chosen at any given frequency of operation to maximize the product of the amplitude of the temperature variation and the sine of the thermal lag angle, so as to increase power and efficiency. Because of the thermal lag requirement, a heat exchanger of this invention typically has a passageway width greater than that of heat exchangers employed in Stirling cycle engines operating at the same frequency.

The breadth and length of a passageway are generally each made larger than the width in order to increase the volume and decrease the fluid drag of the passageway. Thereby, the amount of gas that can be heated or cooled by the passageway is increased, with a minimum increase in surface area and viscous drag. The resulting passageway structure is relatively compact and provides good heating and cooling paths through the solid material forming the passageway walls. Thereby, external heating and cooling of the passageways is made more efficient.

The passageways thus have a characteristic thermal time constant for heating or cooling fluid. The time constant is primarily determined by the average width of the passageways, and secondarily by other factors such as length, and breadth, smoothness, properties of the fluid, and conditions of operation. These factors are chosen according to the desired frequency of operation to provide a thermal time constant which results in a sufficient phase angle of thermal lag at the oscillation frequency to sustain oscillation and to provide an adequate or optimum amplitude of oscillation. The proportionality mentioned above for compression ratios less than 2:1 may be less accurate for higher compression ratios but is nevertheless valuable as a guide for designing, at a given frequency of operation, an optimum thermal lag heating chamber and an optimum thermal lag cooling chamber.

Because of the thermal lag requirement, it is desired that heating of gas predominate over cooling for a period of time after maximum compression. Correspondingly, it is desired that the net cooling of gas near minimum compression continue for a period of time after minimum compression.

It should be understood that almost any compressible fluid, such as a liquid and its vapor, may be used as the working fluid of this device. However, the thermal lag device of this invention, by itself, is not expected to be as efficient an energy converter as some existing heat engines.

It should also be understood that the center of oscillation of all the pistons illustrated in all the embodiments herein can be positioned either by check valves, similar to the techniques shown in FIGS. 1 and 13, or by passageway means bypassing a portion of the cylinder wall, as illustrated in FIGS. 16, 17 and 18. For example, in each of FIGS. 14 and 15, the pistons could be positioned by means of three inlet check valves or by means of two by-pass passageways or grooves. In addition, the check valve arrangement illustrated in FIG. 13 for pumping gas can be adapted to any of the embodiments illustrated herein. Pumping power can thus be drawn from any and all chambers of the devices illustrated by appropriately connecting the check valves to the chambers.

While there have been described and illustrated several specific embodiments of the invention, it will be clear that variations in the details of the embodiments specifically illustrated and described may be made without departing from the true spirit and scope of the invention as defined in the appended claims. For example, the passageways means can modify the thermal lag and the amount of heating of the gas by forming the passageway wall material to have a specific heat, thermal conductivity and geometrical configuration to provide a thermal time constant that causes cycling of the wall temperature at substantially the same frequency as the piston oscillates.

The device of FIG. 18 can be modified in numerous ways, such as providing an upwardly extending hollow tube to connect the heated passageways with the cylinder containing the free piston. It is also possible to eliminate clip 73 by forming the passageways in a pair of interconnected sections, each adapted to fit on opposite sides of a lamp globe and dimensioned to be slighly smaller than the globe so as to be frictionally held on the globe with the aid of a fluid conduit connecting the two sections together.

The device described herein may also be used as a cooling device, e.g., for cooling a typical engine valve. Thus, the valve head would contain the heated passageways and the cooled valve stem would contain the oscillating piston. Oscillation of the piston and a gas or fluid within the sealed valve would cool the valve head and valve seat by transferring heat to the valve stem and valve guide and thence to a water jacket or other conventional means for cooling a valve stem.

What is claimed is:

1. An oscillating piston apparatus comprising a cylinder, a free piston in the cylinder, said [cyliner] *cylinder* having a side wall with a port therein, a rebound chamber containing compressible fluid for reversing the motion of the piston[.], said rebound chamber having as a moving wall portion a face of the piston, means including said rebound chamber for sustaining oscillatory motion of the piston in the cylinder and means for controlling the location of the center of oscillation of the piston in the cylinder, said controlling means including said rebound chamber and a passageway communicating with the cylinder via the port, said passageway by-passing a portion, and only a portion, of the axial length of the cylinder, said passageway having a fluid flow impedance which is substantially the same for fluid flow in either direction through the passageway, wherein said port, said by-passed portion of the cylinder, and an unbypassed portion of the cylinder are all at least partially traversed by the piston.

2. The apparatus of claim 1 wherein the free piston is of substantially integral construction.

3. The apparatus of claim 1 wherein the cross-sectional dimensions of the free piston are substantially the same throughout substantially all of its length.

4. The apparatus of claim 1 wherein the means for sustaining includes means for alternately heating and cooling the fluid.

5. The apparatus of claim 1 wherein the means for sustaining includes heated passageway means communicating with said cylinder.

6. The apparatus of claim 5 further including means for heating said heated passageway means.

7. The apparatus of claim 5 wherein said heated passageway means includes at least one passageway having a characteristic length and breadth which are each substantially greater than its characteristic width.

8. The apparatus of claim 1 further including another rebound chamber for reversing the motion of the piston, wherein the two rebound chambers are gaseous chambers acting as compression springs on opposite faces of the piston.

9. The apparatus of claim 1 further including a second port in the cylinder side wall, said passageway further communicating with the cylinder via said second port, wherein the two ports are located at different axial positions in the cylinder side wall, and the axial length of the by-passed cylinder portion is determined primarily by the axial separation and size of said ports.

10. The apparatus of claim 1 wherein the axial length of said by-passed cylinder portion is less than the axial length of the piston side wall.

11. The apparatus of claim 1 wherein the passageway is of integral construction.

12. The apparatus of claim 1 wherein said controlling means comprises groove means in the cylinder wall in said by-passed portion of the cylinder.

13. The apparatus of claim 1 wherein said passageway has no moving parts.

14. The apparatus of claim 1 wherein the controlling means has no moving parts.

15. The apparatus of claim 1 wherein the sustaining means has no moving parts other than the piston itself.

16. The apparatus of claim 1 wherein the controlling means is of integral construction.

17. An oscillating piston apparatus comprising two cylinders, a free piston in each cylinder, each of said cylinders having a side wall with a port therein, means for sustaining oscillatory motion of each piston in its cylinder, and means for controlling the locations of the centers of oscillation of the pistons in their cylinders, said controlling means including: a common chamber for the two cylinders, said common chamber containing compressible fluid and having as moving wall portions one face of each piston, a separate rebound chamber for each piston, said rebound chamber containing compressible fluid and having as a moving wall portion the opposite face of the piston, and a fluid passageway for each cylinder communicating with the respective cylinder via the respective port, said passageway by-passing a portion, and only a portion, of the axial length of the cylinder, said passageway having a fluid flow impedance which is substantially the same for fluid flow in either direction through the passageway; whereby the center of oscillation of each piston is located near the mid-point of the by-passed portion of its cylinder.

18. The apparatus of claim 17 wherein the means for sustaining includes means for synchronizing the oscillatory motion of the pistons.

19. The apparatus of claim 17 wherein the means for sustaining includes means for maintaining synchronous and opposite oscillatory motion of the pistons.

20. The apparatus of claim 17 wherein the means for sustaining includes means for alternately heating and cooling the fluid.

21. The apparatus of claim 17 wherein the means for sustaining includes heated passageway means for repeatedly heating the fluid in the common chamber.

22. The apparatus of claim 17 wherein the passageway for each cylinder consists of a passageway in said portion of the cylinder wall.

23. The apparatus of claim 17 wherein said controlling means for each cylinder comprises groove means in the cylinder wall in said by-passed portion of the cylinder.

24. The apparatus of claim 17 wherein said controlling means for each cylinder includes by-pass passageway means having no moving parts.

25. The apparatus of claim 17 wherein the free pistons are each of substantially integral construction.

26. The apparatus of claim 17 wherein the cross-sectional dimensions of each piston are substantially the same throughout substantially all of the piston length.

27. The apparatus of claim 17 wherein the axial length of said by-passed cylinder portion is less than the axial length of the piston side wall.

28. The apparatus of claim 17 wherein the sustaining means has no moving parts other than the two free pistons.

29. A naturally resonant oscillatory device comprising a chamber containing compressible fluid, said chamber having structure forming at least one peripheral wall portion susceptible to being oscillated at a natural resonant frequency of oscillation so as to cyclically decrease and increase the volume of the chamber, said chamber being substantially sealed during at least a substantial portion of the oscillation cycle, said chamber having fluid passageway means communicating with the at least one wall portion, means for heating said fluid passageway means, means for sustaining oscillatory motion of the at least one wall portion of the chamber so as to alternately decrease and increase the volume of the chamber, means including the oscillatory motion of the wall portion for repeatedly inducing a flow of cool fluid into said heated passageway means; said heated passageway means being designed in accordance with the frequency of oscillation to: (a) readily admit said cool fluid, (b) heat substantially all of said admitted fluid, (c) heat fluid in the passageway means as the oscillating wall portion moves in a direction to increase the volume of the chamber during said portion of the cycle, and (d) eject heated compressible fluid from the passageway means into a region of the chamber external to the passageway means as the oscillating wall portion moves in a direction to increase the volume of the chamber during said portion of the cycle; said cool fluid flow inducing means further including means for cooling fluid ejected from said heated passageway means, said means for sustaining including: (a) the heated fluid passageway means, (b) the flow inducing means including the motion of said wall portion and the means for cooling ejected fluid, (c) inertia of the structure, and (d) spring action of fluid compressed by the oscillating wall portion; wherein the energy for sustaining said oscillation is derived primarily from said heating and said cooling; wherein a net flow of fluid is induced into the heated passageway means while the volume of the chamber is decreasing during said portion of the cycle, said net flow being primarily and directly responsive to pressure variations of the fluid in the chamber resulting primarily and directly from changes in the chamber volume caused by the oscillating portion.

30. The device of claim 29 wherein said means for cooling said ejected fluid primarily comprises cooling of the ejected fluid by cool wall surfaces of the chamber external to said heated passageway means.

31. The device of claim 29 wherein said heating means includes means for heating said fluid passageway means substantially independently of the instantaneous phase of said at least one oscillating peripheral wall portion.

32. The device of claim 29 wherein said at least one oscillating peripheral wall portion includes two peripheral wall portions oscillating substantially in synchronism so as to, substantially with the same phase, cyclically decrease and increase the volume of the chamber.

33. The device of claim 32 wherein each of the wall portions is a free piston oscillating in a cylinder.

34. The device of claim 33 further including groove means for each cylinder bypassing only a portion of the cylinder for positioning the center of oscillation of the free piston.

35. The device of claim 32 wherein said cooling of the ejected fluid primarily includes cooling of the ejected fluid by cool walls of the chamber external to the heated passageway means.

36. The device of claim 35 wherein said cool walls primarily include walls of the chamber proximate the oscillating portions and the faces of the oscillating portions.

37. The device of claim 32 wherein the means for heating the passageway means includes for heating the passageway means substantially independently of the instantaneous phases of the oscillating wall portions.

38. The device of claim 32 wherein said wall portions communicate both with each other and with said heated passageway means via a fluid flow connecting means, wherein said means for sustaining oscillation includes cooling of said ejected fluid by cool walls of the connecting means proximate the oscillating portions.

39. The device of claim 29 wherein said heated passageway means includes an elongated passageway having an average length substantially greater than its average width.

40. The device of claim 29 wherein said chamber is substantially sealed during substantially all of the oscillatory cycle.

41. The device of claim 29 wherein said heating means includes means for heating said passageway means substantially independently of said natural resonant frequency of oscillation.

42. The device of claim 29 wherein said passageway means comprises an elongated passageway having an average length and an average breadth each of which is substantially greater than the average width of the passageway.

43. The device of claim 29 wherein there is an increase in effective exposure of a cool surface to fluid in the chamber as the wall portion moves in a direction to increase the chamber volume, whereby said means for cooling the ejected fluid includes cooling of the ejected fluid by said variably exposed cool surface.

44. The device of claim 29 wherein said heating of fluid in said passageway means and said cooling of ejected fluid each primarily comprises thermal transfer between the fluid and walls of the chamber.

45. The device of claim 29 wherein the means for sustaining oscillation includes cooling of the ejected fluid by cool wall surfaces of the chamber proximate the oscillating portion.

46. The device of claim 45 wherein said cool wall surfaces include an exposed face of the oscillating portion.

47. The device of claim 29 wherein the heated passageway means includes an elongated passageway having a characteristic passageway width selected in accordance with the oscillatory frequency to augment said oscillation.

48. The device of claim 29 wherein the heated passageway means includes a multiplicity of heated elongated passageways.

49. The device of claim 29 wherein the passageway means is formed to mate with an electric bulb which provides heat for heating the passageway means.

50. The device of claim 29 wherein said inducing of cool fluid into said heated passageway means for said heating and ejecting of said fluid takes place primarily while said chamber volume is decreasing during said portion of the cycle.

51. The device of claim 29 wherein said inducing of cool fluid into said heated passageway means for said heating and ejecting of said fluid takes place substantially entirely while said chamber volume is decreasing during said portion of the cycle.

52. The device of claim 29 wherein said wall portion comprises a free piston oscillating in [the] *a* cylinder.

53. The device of claim 52 further including cylinder bypass means for positioning the center of oscillation of the free piston in the cylinder.

54. The device of claim 53 wherein said bypass means bypasses only a portion of the cylinder, said center of oscillation being positioned near the mid-point of the bypassed portion.

55. The device of claim 54 wherein the bypass means includes a bypass passageway bypassing said bypassed cylinder portion and having substantially equal fluid flow impedance in either direction through the passageway.

56. The device of claim 55 wherein said passageway is of integral construction.

57. The device of claim 55 wherein said passageway is integral with the cylinder.

58. The device of claim 55 wherein said bypass means comprises groove means in the cylinder sidewall.

59. The device of claim 55 wherein said bypass means comprises means for forming the cylinder side wall to provide a lower impedance to fluid flow between the piston and cylinder side walls in the bypassed portion of the cylinder than in portions of the cylinder beyond the bypassed portion.

60. A naturally resonant oscillatory device comprising a variable volume chamber, said chamber having structure forming at least one wall portion susceptible to being oscillated at a natural resonant frequency of oscillation so as to alternately decrease and increase the volume of the chamber, said chamber maintained in a substantially closed condition during at least a portion of the oscillation cycle, said chamber having fluid passageway means communicating with the at least one wall portion, means for heating said fluid passageway means, means for sustaining oscillatory motion of the at least one wall portion of the chamber so as to alternately decrease and increase said chamber volume, means including the oscillatory motion of the wall portion for cyclically inducing a flow of cool fluid into said heated passageway means; said heated passageway means having a geometry and an average passageway width selected in accordance with the frequency of oscillation to readily admit said cool fluid and to heat by thermal transfer means substantially all of said admitted fluid so as to eject heated compressible fluid from the heated passageway means during said portion of the cycle as the oscillating wall portion moves in the same general direction as the ejected fluid and to heat fluid in the heated passageway means during said portion of the cycle as the oscillating wall portion moves in the same general direction as the [ejectef] *ejected* fluid; said means for sustaining including: the heating of the fluid by said passageway means, the means for heating said passageway means, said flow inducing means, inertia of the structure and spring action of fluid compressed by the oscillating wall portion; wherein a net flow of fluid is induced into the heated passageway means while the fluid is being compressed toward the heated passageway means by the oscillating portion during said portion of the cycle, said net flow being primarily and directly responsive to pressure variations of the fluid in the chamber resulting primarily and directly from changes in the chamber volume caused by the oscillating portion.

61. The device of claim 60 wherein said cool fluid inducing means includes thermal transfer means for cooling said ejected fluid.

62. The device of claim 61 wherein said cooling means primarily includes cooling of the ejected fluid by cool walls of the chamber external to the heated passageway means.

63. The device of claim 61 wherein said cooling means includes cooling of the ejected fluid by cool walls of the chamber cyclically varied in effective exposure to the fluid by the oscillating portion.

64. The device of claim 61 wherein said cooling provides the primary cooling for sustaining said oscillation.

65. The device of claim 60 wherein the cool fluid inducing means primarily includes cooling of the ejected fluid by cool walls of the chamber proximate the oscillating portion.

66. The device of claim 60 wherein the cool fluid inducing means includes means for cooling the induced fluid.

67. The device of claim 66 wherein the energy for sustaining said oscillation is derived primarily from said heating and said cooling.

68. The device of claim 60 wherein the heat energy for sustaining said oscillation is provided primarily by said heating.

69. The device of claim 60 wherein said fluid passageway means is heated substantially in dependently of the instantaneous phase of the oscillating portion.

70. The device of claim 69 wherein the at least one oscillating peripheral wall portion includes two peripheral wall portions oscillating substantially in synchronism so as to substantially together alternately decrease and increase said chamber volume.

71. The device of claim 70 wherein each of the wall portions is a free piston oscillating in a cylinder.

72. The device of claim 71 wherein the heated passageway means is formed to be heated by an electric light bulb which provides sufficient heat energy for sustaining said oscillation while providing light for illumination of the surroundings.

73. The device of claim 72 further including groove means in the inside surface of the side-wall of each of said cylinders for controlling the center of oscillation of each piston in its cylinder.

74. The device of claim 70 wherein said wall portions communicate both with each other and with said heated passageway means via a fluid connecting means, and wherein said means for sustaining oscillation includes cooling of said induced fluid by cool walls of the connecting means proximate the oscillating portions.

75. The device of claim 69 wherein said heated passageway means includes an elongated passageway having an average length and an average breadth each of which is substantially greater than the average width of the passageway.

76. The device of claim 69 wherein said chamber is substantially sealed during substantially all of the oscillatory cycle.

77. The device of claim 69 wherein the heated passageway means includes a multiplicity of elongated heated passageways.

78. The device of claim 69 wherein said inducing of cool fluid into said passageway means for said heating and ejecting of said fluid takes place substantially entirely while said chamber volume is decreasing during said portion of the cycle.

79. The device of claim 60 wherein said passageway means is heated substantially independently of said natural resonant frequency of oscillation.

80. The device of claim [50] *60* wherein said ejected heated fluid is derived primarily from cool fluid induced into said heated passageway means while said chamber volume decreases during said portion of the cycle.

81. The device of claim 60 wherein said inducing of cool fluid into said passageway means for said heating and ejecting of said fluid takes place primarily while said chamber volume is decreasing during said portion of the cycle.

82. The device of claim 60 wherein the wall portion comprises a free piston oscillating in a cylinder.

83. The device of claim 82 further including means bypassing only a portion of the cylinder to position the center of oscillation of the free piston within the bypassing portion.

84. The device of claim 83 wherein the bypass means includes a bypass passageway bypassing said cylinder portion and having substantially equal impedance for fluid flow in either direction through the passageway.

85. The device of claim 83 wherein said bypass means comprises means for forming the cylinder sidewall to provide a greater mean separation between the piston and cylinder side walls in the bypassed cylinder portion than in a cylinder portion beyond the bypassed portion.

86. The apparatus of claim 1 wherein said passageway and said port comprise an enlargement of the inside diameter of the cylinder in a region of the cylinder side-wall within said bypassed portion.

87. The apparatus of claim 17 wherein said passageway and said port for each cylinder comprise an enlargement of the inside diameter of the cylinder in a region of the cylinder side-wall within said bypassed portion.

88. The device of claim 82 further including means bypassing only a portion of the cylinder to position the center of oscillation of the free piston near the bypassed portion.

*89. In a free-piston device having at least one free-piston mounted for reciprocation in a cylinder, a gaseous fluid maintained in the cylinder at at least one end of the free-piston, the improvement comprising means associated with the cylindrical walls of the piston and cylinder for reducing the tendency of the piston to creep into or out of the working gas space of the cylinder as it reciprocates in the cylinder, wherein the cylinder has a snug piston receiving bore, and means for providing a by-pass for the fluid proximate a desired mid-point of the stroke of the piston in the cylinder, said by-pass including at least one gas passage of a length less than the length of the piston and extending axially along the piston cylinder interface in opposite directions from the desired mid-point of the stroke of the piston.*

*90. The free piston device defined in claim 89 wherein the gas passage is provided in the cylindrical wall of the cylinder.*

*91. The device of claim 90 further including means for maintaining a gaseous fluid at the end of the free piston opposite from the one end.*

*92. The device of claim 89 further including means for maintaining a gaseous fluid at the end of the free piston opposite from the one end.*

*93. An oscillating piston apparatus comprising a cylinder, a free piston in the cylinder, means for sustaining oscillatory motion in the piston in the cylinder, and means for controlling the location of the center of oscillation of the piston in the cylinder, said controlling means including a rebound chamber for reversing the motion of the piston and at least one passageway extending axially along the side wall of the cylinder to bypass a portion of the cylinder and having a fluid flow impedance which is substantially the same for fluid flow in each direction through the at least one passageway, wherein said portion of the cylinder is at least partially traversed by the piston, and wherein the length of said bypassed cylinder portion in a direction along the cylinder axis is less than the length of the piston side wall in said direction.*

*94. The apparatus of claim 93 further including another rebound chamber for reversing the motion of the piston,*

*wherein the two rebound chambers are gaseous chambers acting as compression springs on opposite faces of the piston.*

*95. The apparatus of claim 94 wherein the free piston is of substantially integral construction.*

*96. An oscillating piston apparatus comprising a cylinder, a free piston in the cylinder, means for sustaining oscillatory motion in the piston in the cylinder, and means for controlling the location of the center of oscillation of the piston in the cylinder, said controlling means including a rebound chamber for reversing the motion of the piston and at least one passageway bypassing a portion of the cylinder and having a fluid flow impedance which is substantially the same for fluid flow in each direction through the at least one passageway, wherein said portion of the cylinder is at least partially traversed by the piston, and wherein the length of said bypassed cylinder portion in a direction along the cylinder axis is less than the length of the piston side wall in said direction, wherein the cross-sectional dimensions of the free piston are substantially the same throughout substantially all of the length of the piston.*

*97. The apparatus of claim 93 wherein the free piston is of substantially integral construction.*

*98. The apparatus of claim 93 wherein the cross-sectional dimensions of the free piston are substantially the same throughout substantially all of the length of the piston.*

*99. In a free-piston engine or pump having at least one free-piston mounted for reciprocation in a cylinder, a pressurized gaseous fluid maintained in the cylinder at at least one end of the free-piston, the improvement comprising means associated with the cylindrical walls of the piston and the cylinder for reducing the tendency of the piston to creep into or out of the working gas space of the cylinder as it reciprocates in the cylinder, wherein the cylinder has a snug piston receiving bore and means extending axially on the cylinder wall providing at least one gas passage of a length less than the length of the piston and extending in opposite directions from the mid-point of the stroke of the piston.*

*100. A method of reducing the tendency of a free-piston of a free-piston motion device to creep into or out of the working space of its cooperating cylinder comprising the steps:*

*forming a bore in a cylinder to snugly receive a piston within the bore; and*

*forming an axial gas passage in the cylindrical surface of the cylinder of a length less than the length of the piston.*

*101. An oscillating piston apparatus comprising a cylinder, a free piston in the cylinder between rebound chambers containing compressible fluid at opposite faces of the free piston, means for sustaining oscillation of the free piston in the cylinder, bypass means for controlling the location of the center of oscillation of the free piston in the cylinder, said bypass means comprising at least one passageway bypassing a portion of a side wall of the cylinder, said passageway being capable of carrying fluid in each direction according to the polarity of the instantaneous pressure differential across the passageway, said passageway having at least one port in the cylinder sidewall, said passageway configured to bypass a varying length of the piston sidewall as the piston oscillates in the cylinder, said length generally decreasing as the piston moves in a direction away from a preferred location for the center of oscillation of the piston, movement of the center of piston oscillation away from said preferred location in said direction causing a greater travel of the piston in said direction and a greater average impedance to fluid flow in the opposite direction along the piston sidewall, whereby there is a net fluid flow along the piston sidewall in said direction tending to move the center of piston oscillation in the opposite direction.*

*102. The apparatus of claim 101 wherein said bypass means comprises groove means in the cylinder sidewall, and said passageway is a groove in the cylinder wall.*

*103. The apparatus of claim 101 wherein said bypass means is disposed solely exterior to the piston.*

*104. The apparatus of claim 101 wherein said passageway is formed in the sidewall of the cylinder.*

*105. The apparatus of claim 101 wherein the bypass means is formed solely in the sidewall of the cylinder.*

*106. The apparatus of claim 101 wherein said bypass means consists of substantially axial groove means in the cylinder sidewall.*

*107. The apparatus of claim 101 wherein said passageway is formed to have a fluid flow impedance which is substantially the same for fluid flow in either direction through said passageway.*

*108. The apparatus of claim 101 wherein said passageway is configured and disposed such that said passageway remains stationary relative to the cylinder throughout the oscillatory cycle.*

*109. The apparatus of claim 101 wherein the length of said port in a direction along the cylinder axis is a substantial fraction of the axial length of the piston sidewall, said piston sidewall blocking said port to a varying degree during the oscillatory cycle.*

*110. The apparatus of claim 101 wherein the length of said port in a direction along the cylinder axis is approximately equal to the axial length of the piston sidewall.*

*111. The apparatus of claim 101 wherein the means for sustaining includes means for alternately heating and cooling the fluid.*

*112. The apparatus of claim 101 wherein all surfaces of said bypass means remain stationary with respect to said cylinder throughout the oscillatory cycle.*

*113. The apparatus of claim 101 wherein the piston sidewall is impervious to fluid flow through the sidewall.*

*114. The apparatus of claim 101 wherein the outer surface of the piston sidewall has the shape of a cylinder section.*

*115. The apparatus of claim 101 wherein the length of said bypass means in a direction along the cylinder axis is approximately equal to the axial length of the piston sidewall.*

*116. The apparatus of claim 101 wherein the axial length of said bypass means is slightly less than the axial length of the piston sidewall.*

*117. An oscillating piston apparatus comprising a cylinder, a free piston in the cylinder, means for maintaining a compressible fluid at at least one end of the free piston, means for sustaining oscillation of the free piston in the cylinder, and passageway means extending axially along an interface between the piston and cylinder for locating the center of piston oscillation proximate said passageway means.*

*118. The apparatus of claim 117 wherein said passageway means comprises groove means disposed along said interface.*

*119. The apparatus of claim 118 wherein said groove means has an orientation approximately parallel to the cylinder axis.*

*120. The apparatus of claim 118 wherein said groove means is disposed in the sidewall of the cylinder.*

*121. The apparatus of claim 117 wherein said passageway means consists of groove means in the sidewall of the cylinder.*

*122. The apparatus of claim 117 wherein said passageway means has substantially equal fluid flow impedances in opposite directions along said passageway means.*

*123. The apparatus of claim 117 wherein said passageway means is shorter in an axial direction than the expected extremes of travel of the piston.*

*124. The apparatus of claim 117 wherein the length of said passageway means along the cylinder axis is approximately equal to the axial length of the piston sidewall.*

*125. The apparatus of claim 117 wherein the axial length of said passageway means is less than the axial length of the piston sidewall.*

*126. The apparatus of claim 117 wherein said passageway means bypasses a portion, and only a portion, of the axial length of the cylinder.*

*127. The apparatus of claim 117 wherein the piston sidewall is impervious to fluid flow through the sidewall.*

*128. The apparatus of claim 117 wherein the outer surface of the piston sidewall has the shape of a cylinder section.*

*129. The apparatus of claim 117 wherein said passageway means is disposed solely exterior to the piston.*

*130. The apparatus of claim 117 wherein all bounding surfaces of said passageway means are stationary relative to the cylinder.*

*131. The apparatus of claim 117 wherein the means for sustaining comprises means for alternately heating and cooling the fluid.*

*132. The apparatus of claim 117 wherein said piston oscillates between rebound chambers containing compressible fluid at opposite ends of the piston.*

*133. An oscillating piston apparatus comprising a cylinder, a free piston in the cylinder between rebound chambers containing compressible fluid at opposite end faces of the free piston, means for sustaining oscillation of the free piston in the cylinder, cylinder bypass means for controlling the location of the center of oscillation of the free piston in the cylinder, wherein said bypass means includes at least one bypass passageway bypassing a portion of the cylinder proximate a desired location for the center of piston oscillation, said passageway being capable for carrying fluid in either direction through said passageway according to the polarity of the instantaneous pressure differential across the passageway, said bypass means in conjunction with the piston motion facilitating a gradual and automatic adjustment in the relative amounts of fluid in said rebound chambers tending to prevent drift of the piston center of oscillation away from said preferred location, wherein said bypass means is disposed solely exterior to the piston and includes at least one port along the piston-cylinder interface.*

*134. The apparatus of claim 133 wherein the fluid flow impedance of said passageway is substantially the same in either said direction.*

*135. The apparatus of claim 133 wherein said cylinder bypass means is disposed in the cylinder sidewall.*

*136. The apparatus of claim 133 wherein the cylinder bypass means bypasses a portion, and only a portion, of the axial length of the cylinder.*

*137. The apparatus of claim 133 wherein the length of said passageway in a direction along the cylinder axis is approximately equal to the axial length of the piston sidewall.*

*138. The apparatus of claim 133 wherein the length of said passageway in a direction along the cylinder axis is less than the axial length of the piston sidewall.*

*139. The apparatus of claim 133 wherein the piston sidewall has a contiguous design such that fluid is prevented from flowing through the piston sidewall.*

*140. The apparatus of claim 133 wherein the shape of the outer surface of the piston sidewall is a cylinder section.*

*141. The apparatus of claim 133 wherein the means for sustaining includes means for repeatedly heating the fluid.*

*142. The apparatus of claim 133 wherein the length of said bypass means in a direction along the cylinder axis is less than the expected axial length of the piston cylinder interface.*

*143. The apparatus of claim 133 wherein the axial length of said bypass means is approximately equal to the axial length of the piston sidewall.*

*144. The apparatus of claim 133 wherein the axial length of said bypass means is slightly less than the axial length of the piston sidewall.*

*145. The apparatus of claim 133 wherein said bypass means is of integral construction.*

*146. The apparatus of claim 133 wherein said bypass means is stationary relative to the cylinder.*

*147. The apparatus of claim 133 wherein said bypass means comprises groove means along the piston-cylinder interface.*

*148. The apparatus of claim 133 wherein, throughout the oscillatory cycle, said bypass means bypasses no more than a portion of the piston.*

*149. The apparatus of claim 133 wherein said bypass means comprises an enlargement of the inside diameter of the cylinder in a region of the piston-cylinder interface.*

*150. The apparatus of claim 133 wherein said bypass means consists of substantially axial groove means along the piston-cylinder interface.*

*151. The apparatus of claim 150 wherein the axial length of said groove means is approximately equal to the axial length of the piston sidewall.*

*152. The apparatus of claim 150 wherein the axial length of said groove means is slightly less than the axial length of the piston sidewall.*

*153. In an oscillating piston apparatus having a cylinder, a means for sustaining oscillation of a free piston in the cylinder, and a rebound chamber containing compressible fluid at at least one end of the cylinder for reversing piston motion, the improvement comprising bypass means providing a limited bypass of a seal between side walls of the piston-cylinder for controlling the location of the center of oscillation of the piston in the cylinder, said bypass means being free of moving parts.*

*154. The apparatus of claim 153 wherein said bypass means is configured to bypass and thereby reduce the piston-cylinder seal primarily during a limited portion of the piston stroke while the piston is proximate a preferred position for its center of oscillation.*

*155. The apparatus of claim 156 wherein said bypass means is integral with the cylinder sidewall.*

*156. The apparatus of claim 154 wherein said bypass means comprises groove means in the cylinder sidewall.*

*157. In an apparatus having a cylinder, a free piston susceptible to undergoing oscillation along the cylinder axis, a rebound chamber at at least one end of the cylinder for reversing piston motion, and a means for sustaining the oscillation of the free piston, the improvement comprising means for controlling the location of the center of oscilla-*

*tion of the piston in the cylinder, wherein said controlling means comprises an axially extending slight enlargement of a portion of an annular clearance space between sidewalls of the piston and cylinder, said enlargement facilitating a net leakage of fluid along the piston sidewall tending to move the center of oscillation axially toward a preferred location thereof.*

*158. The apparatus of claim 157 wherein said enlargement comprises groove means in said annular clearance space.*

*159. The apparatus of claim 157 wherein said enlargement comprises groove means in the cylinder sidewall.*

*160. In an oscillating free piston apparatus, the improvement comprising cylinder bypass means for controlling the location of the center of oscillation of a free piston oscillating in a cylinder of said apparatus, wherein the cylinder bypass means is free of moving parts.*

*161. The apparatus of claim 160 wherein said cylinder bypass means is designed so that the full axial length of the piston sidewall becomes available for contributing to the piston cylinder sliding seal if the piston moves sufficiently far in either direction from the mid-point of said cylinder bypass means.*

*162. The apparatus of claim 160 wherein said bypass means is groove means in the cylinder sidewall.*

* * * * *